(12) United States Patent
Pastoriza et al.

(10) Patent No.: US 8,324,503 B2
(45) Date of Patent: Dec. 4, 2012

(54) WALL MOUNTED TELEVISION CABLE AND CORD ORGANIZING APPARATUS

(76) Inventors: Robert Pastoriza, Miami, FL (US); Daniel Lozano, Miami, FL (US)

(*) Notice: Subject to any disclaimer, the term of this patent is extended or adjusted under 35 U.S.C. 154(b) by 294 days.

(21) Appl. No.: 12/855,344

(22) Filed: Aug. 12, 2010

(65) Prior Publication Data

US 2012/0037401 A1    Feb. 16, 2012

(51) Int. Cl.
*H01B 7/00* (2006.01)
(52) U.S. Cl. ............ 174/135; 174/57; 174/58; 174/559; 439/501; 385/135
(58) Field of Classification Search .............. 439/501, 439/4, 131, 498; 385/134, 135; 206/308.1; 174/58, 57, 66, 559, 135; 160/377; 359/443
See application file for complete search history.

(56) References Cited

U.S. PATENT DOCUMENTS

| | | | |
|---|---|---|---|
| 4,785,140 A | 11/1988 | Adams et al. | |
| 6,094,875 A | 8/2000 | Laine | |
| 6,768,055 B1 | 7/2004 | Gorin | |
| 6,769,562 B2 * | 8/2004 | Schroeder | 220/3.5 |
| 6,894,222 B2 * | 5/2005 | Lalancette et al. | 174/58 |
| 6,906,260 B2 * | 6/2005 | Grendahl | 174/66 |
| 6,940,016 B1 * | 9/2005 | Cornett et al. | 174/58 |
| 7,059,895 B2 | 6/2006 | Murano | |
| 2005/0231080 A1 | 10/2005 | Torrance | |
| 2006/0146463 A1 | 7/2006 | Martin | |

* cited by examiner

*Primary Examiner* — Dhirubhai R Patel
(74) *Attorney, Agent, or Firm* — Craig Kirsch

(57) ABSTRACT

A home theatre cable and cord organizing apparatus including a cable and cord storage compartment having a mounting flange, a power strip receiving port, a removably attachable access plate composed of a material to which paint will adhere, and a plurality of mounting clips. The mounting flange in cooperation with the mounting clips allow for easy installation once an appropriately sized hole is created. With the storage compartment secured in place, the user has an opening from which to access and manage all necessary connection cables and power cords. Once all connections are made, the access plate can be removably attached to the storage compartment providing an aesthetic concealment of the connection cables and power cords until the user needs access at a later time.

10 Claims, 1 Drawing Sheet

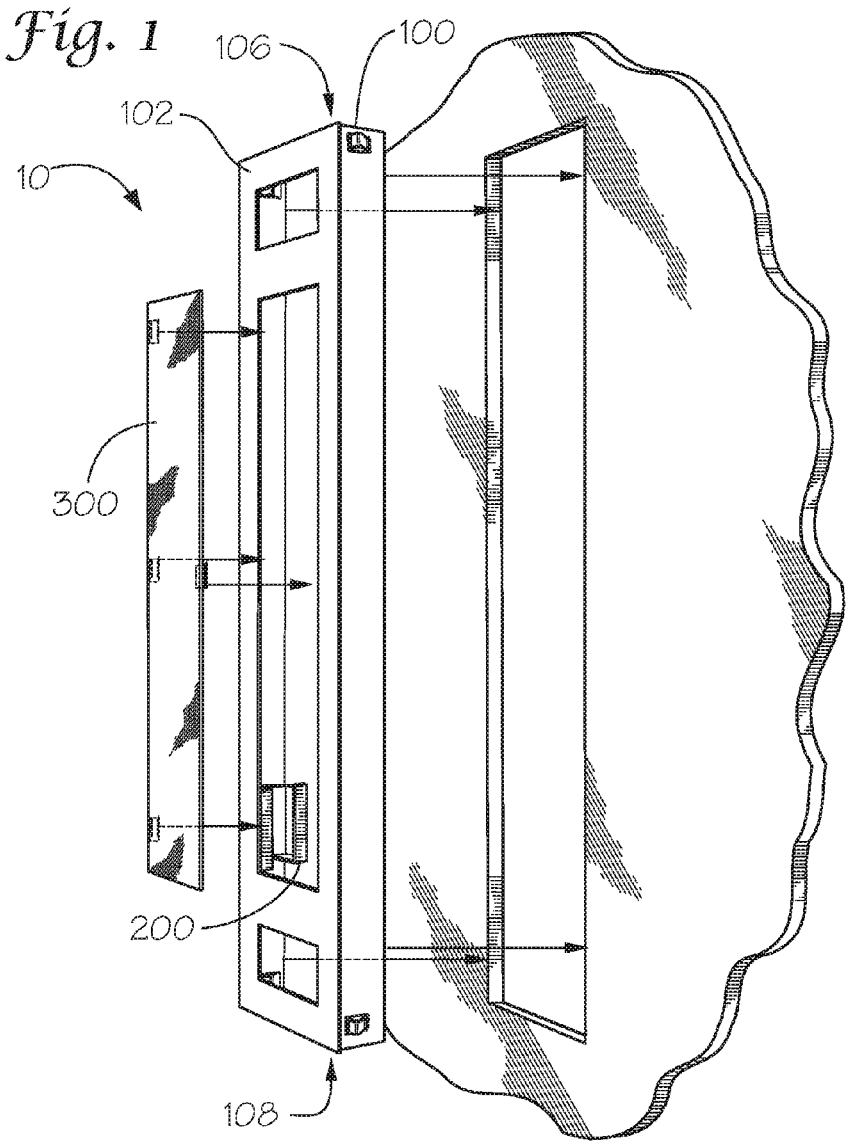
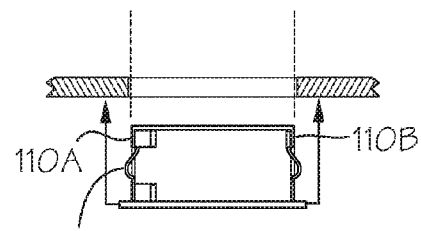
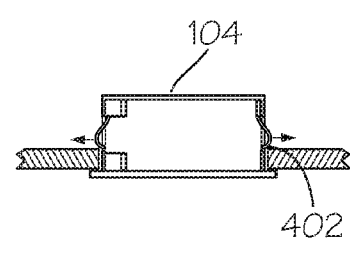

WALL MOUNTED TELEVISION CABLE AND CORD ORGANIZING APPARATUS

BACKGROUND

The present invention relates to storage and organization apparatuses, specifically apparatuses for storing and organizing connection cables and power cords associated with wall mounted televisions and related components.

With the advances in technology, the rear projection television is a thing of the past and the new industry standard has become the flat panel plasma, LCD, or LED television. In addition to the heightened level of clarity, the noticeably thinner design is one of the defining characteristics of this new television technology.

The thinner design has made it possible to mount a television on virtually any flat surface in one's home.

It has become more and more common for people to mount a large screen flat panel television on one of the walls in their home to create a personal home theatre in their chosen room. Mounting a television on a wall is a space-efficient method of placing the television one's home and when done properly a wall mounted television can be a decorative addition the home.

Many people choose to incorporate additional components such as multi-speaker surround sound audio systems, digital video disk (DVD) players, digital video recording (DVR) systems, as well as digital or cable television receivers into their home theatres to enhance their viewing experience.

Each additional component, however, requires an additional connection cable and often times, an additional electric power cord. Often times the connection cables and power cords get tangled together and form an unsightly jumbled knot of cables and cords. With each additional component the unsightly jumbled knot grows and grows. Even if the cables and cords do not become knotted together, the additional cables and cords form a distracting and unsightly cascade of cables and cords from the television set down to the floor.

The jumbled knot or cascading cables and cords detract from the decorative, sleek, and clean visual effect many seek in a wall mounted television set.

Professional installation services can hide the unsightly jumble of cables and cords behind the wall to which the television is mounted using a "drill and feed" method whereby typically an entry hole and an exit hole are drilled in the wall to which the television is mounted and then the cables and cords are fed through the entry hole, behind the wall and then out the exit hole to the television or related component. However, the homeowner is left to fend for him or herself each time a component is added, removed or replaced. For many, this can be a daunting task.

Moreover, the drill and feed method, uses the wall to hide the cables and cords and therefore makes accessing the cables and cords extremely difficult.

In order to solve the problem of hiding, accessing and organizing the multitude of connection cables and power cords necessary for the additional components in one's home theatre, the inventors have invented the present invention, specifically a home theatre cable and cord organizing apparatus comprising essentially of a cable and cord storage compartment, a power strip receiving port, an access plate, and a plurality of mounting clips. The home theatre cable and cord organizing apparatus allows for easy installation, easy access and aesthetic concealment of the multitude of connection cables and power cords associated with wall mounted home theatres.

An objective of the present invention is to provide an organizational apparatus that can be easily installed.

Another objective of the present invention is to provide an organizational apparatus that allows for easy access to connection cables and power cords associated with wall mounted home theatres.

Yet another objective of the present invention is to provide an organizational apparatus that provides for the aesthetic concealment of the connection cables and power cords associated with wall mounted home theatres.

Information relevant to attempts to address these objectives can be found in previous attempts to address the foregoing problem can be found in U.S. Pat. No. 6,768,055; U.S. Pat. No. 7,059,895; U.S. Pat. No. 4,785,140; U.S. Pat. No. 6,094,875; United States Patent Publication No. 2006/0146463; and United States Patent Publication No. 2005/0231080. However, each of these references suffers from one or more of the following disadvantages: the reference fails to disclose a self mounting apparatus, the reference does not provide for a wall mounting apparatus, the reference does not provide an apparatus with a mounting flange, and the reference does not provide for an apparatus with a port for receiving a power strip.

For the foregoing reasons, there is a need for a wall mounted television cable and cord organizing apparatus that allows for easy installation, easy access and aesthetic concealment of the multitude of connection cables and power cords associated with wall mounted home theatres.

SUMMARY

The present invention relates to storage and organization apparatuses, specifically an apparatus for storing and organizing connection cables and power cords associated with wall mounted televisions and related components.

The home theatre cable and cord organizing apparatus comprises essentially of a cable and cord storage compartment having a mounting flange, a power strip receiving port, a removably attachable access plate composed of a material to which paint will adhere, and a plurality of mounting clips. The mounting flange in cooperation with the plurality of mounting clips allow for easy installation once an appropriately sized hole is created. With the storage compartment secured in place, the user has an opening from which to access and manage all necessary connection cables and power cords. Once all connections are made, the access plate can be removably attached to the storage compartment providing an aesthetic concealment of the connection cables and power cords until the user needs access at a later time. In the event that the user wishes to further conceal the cable and cord organizing apparatus, the removably attachable access plate may be painted to match the wall to which it is mounted.

The home theatre cable and cord organizing apparatus allows for easy installation, easy access and aesthetic concealment of the multitude of connection cables and power cords associated with wall mounted home theatres.

DRAWINGS

These and other features, aspects, and advantages of the present invention will become better understood with regard to the following description, appended claims and drawings where:

FIG. 1 shows a perspective view of one embodiment of the present invention in an exploded view;

FIG. 2 shows a top view cross section of one embodiment of the present invention as prior to installation;

FIG. 3 shows a top view cross section of one embodiment of the present invention as during to installation; and FIG. 4 shows a top view cross section of one embodiment of the present invention as post installation.

DESCRIPTION

As shown in FIGS. 1-4, one embodiment of a home theater connection cable and power cord organizing apparatus 10 is depicted. The home theater connection cable and power cord organizing apparatus 10 comprises of a cable storage compartment 100, a power strip receiving port 200, at least one access panel 300, and a plurality of mounting clips 400.

In a preferred embodiment the cable storage compartment 100 is a rectangular shaped substantially hollowed box compartment comprised of a front panel 102 defining at least one opening, a rear panel 104, a top panel 106, a bottom panel 108 and oppositely arranged side panels 110A and 110B. The front 102, rear 104, top 106, bottom 108, and side panels 110A and 110B are arranged to enclose and define the substantially hollow interior portion of the cable storage compartment 100. The front panel 102 is larger than the rear panel 104 and positioned so that the front panel 102 extents past the top 106, bottom 108, and side panels 110A and 110B to form a front panel mounting flange 112. It is envisioned that the cable storage compartment 100 might be composed of a hard polymer or other similar plastic material. Although the preferred embodiment contemplates a rectangular cable storage compartment 100, it is envisioned that the cable storage compartment 100 may also be oval or other geometric shapes. The preferred embodiment contemplates a front panel 102 that contemplates three openings, a large opening substantially in the middle of the cable storage compartment 100 and two smaller openings located one at each end of the cable storage compartment 100; however, it is envisioned that the front panel 102 may define less than three openings. It is further envisioned each opening on the front panel 102 might further comprise of a non-abrasive coating or other protective material, spanning the edge of each opening so that cables and cords would not be damaged when they rub against the openings of the front panel 102 during installation of each component.

The power strip receiving port 200, is fixedly attached to one of the side panels 110A or 110B facing the interior portion of the cable storage compartment 100. The power strip receiving port 200 is sized and configured to secure a standard multi-outlet power strip in a fixed location. Standard multi-outlet power strips are known in the art and typically consist of a series of three pronged outlets wired together configured in a straight line. It is envisioned that a standard power strip would be secured in power strip receiving port so that the outlets of the power strip face towards the interior portion of the cable storage compartment 100.

The access panel 300 is sized and configured to be removably attached to the front panel 102. It is envisioned that the access panel 300 might be composed of a material to which paint would adhere to, such as a hard polymer or other plastic material. It is further envisioned that the access panel 300 will be removably attached to the front panel 102 using a tongue and grove snap configuration or other similar snap-on/snap-off configuration known in the art.

The mounting clips 400 are fixedly attached to the side panels 110A and 110B of the cable storage compartment 100. It is envisioned that each mounting clips 400 would have at least one edge 402 that is sized and configured to engage the flat surface of a wall with the front panel mounting flange 112 to secure the apparatus 10 in a fixed position. It is envisioned that the mounting clips 400 might be composed of metallic material although it is also envisioned that the mounting clips 400 might also be composed of a hard polymer or similar plastic material. Regardless of the composition, the mounting clips 400 must have a spring like characteristic whereby each mounting clip 400 might move from a first extended position to a second compressed position depending on the force exerted on the mounting clip 400. FIGS. 2 and 4 depict a mounting clip 400 in an extended position and FIG. 3 depicts a mounting clip in a compressed position.

In order to use the apparatus 10, a hole, corresponding substantially to the dimensions of the rear panel 104 must first be cut into the wall to which the apparatus 10, and later the home theatre, will be mounted. Once the hole is cut in the wall, the apparatus is placed into the wall so that the bottom panel 108 is resting on the edge of the hole in the wall and the apparatus 10 is pushed into the wall. As the apparatus is pushed into the wall, the mounting clips 400 will move from an initial extended position to a temporary compressed position and then back to the extended position, thereby sandwiching portions of the wall in between the flat edge 402 of the mounting clip 400 and the front panel mounting flange 112. (See FIGS. 2-4). Once the mounting clips 400 engage the portions of the wall as described, the apparatus 10 is installed and ready for use. In addition to providing support and a means for mounting the apparatus 10, the front panel mounting flange 112 also conceals any imperfections that may have resulted from cutting the hole in the wall.

With the apparatus in place, cables and cords from the wall mounted television set are fed into the top opening of the front panel 102, through the interior portion of the cable storage compartment 100 and then out the bottom opening of the front panel 102 to the various home theatre components. Once the cables and cords are all fed in this manner and the access panel 300 is removably attached to the front panel 102, the cables and cords are neatly concealed but easily accessible should the need to access arise. In order to further conceal the apparatus 10, the access panel 300 may be painted to match the wall to which it was mounted.

An advantage of the present invention is that it provides an organizational apparatus that can be easily installed.

Another advantage of the present invention is that it provides an organizational apparatus that allows for easy access to connection cables and power cords associated with wall mounted home theatres.

Yet another advantage of the present invention is that it provides an organizational apparatus that provides for the aesthetic concealment of the connection cables and power cords associated with wall mounted home theatres.

Although the present invention has been described in considerable detail with reference to certain preferred versions thereof, other versions are possible. Therefore, the spirit and the scope of the claims should not be limited to the description of the preferred versions contained herein.

What is claimed is:

1. A home theater connection cable and power cord organizing apparatus comprising:
   a cable storage compartment, the cable storage compartment having;
      a front panel, the front panel defines at least one opening;
      a rear panel that is smaller than the front panel;
      a top panel;
      a bottom panel; and
      oppositely arranged side panels;
      the front, rear, top, bottom, and side panels arranged to enclose an interior portion of the cable storage compartment whereby the front panel extends past the top, bottom, and side panels to form a front panel mounting flange;

a power strip receiving port fixedly attached to one of the side panels facing the interior portion of the cable storage compartment, the power strip receiving port is sized and configured to secure a power strip in a fixed location;

at least one access panel, sized and configured to be removably attached to the front panel; and a plurality of mounting clips fixedly attached to the side panels of the cable storage compartment wherein each mounting clip has at least one edge sized and configured to engage a flat surface of a wall to securely hold the apparatus in place.

2. The apparatus of claim 1, wherein the cable storage compartment is rectangular in shape.

3. The apparatus of claim 1, wherein the mounting clips are sized and configured to engage the front panel mounting flange with a wall in a house to secure the apparatus in a fixed position.

4. The apparatus of claim 1, wherein the cable storage compartment is composed of a polymer or a plastic material.

5. The apparatus of claim 4, wherein the mounting clips are composed of a semi metallic substance.

6. The apparatus of claim 4, wherein the mounting clips are composed of a hard polymer or a plastic material.

7. The apparatus of claim 1, wherein the front panel defines exactly three openings.

8. The apparatus of claim 7, wherein each of said openings on the front panel further comprises of a non-abrasive coating spanning the edge of each of said openings.

9. A home theater connection cable and power cord organizing apparatus comprising:

a rectangular shaped cable storage compartment measuring four feet in height, ten inches in width and three inches in depth composed of a hard polymer or a plastic material, the cable storage compartment having;

a front panel, the front panel defines three openings, whereby each of said openings further comprises of a non-abrasive coating spanning the edge of each of said openings;

a rear panel that is smaller than the front panel;

a top panel;

a bottom panel; and oppositely arranged side panels;

the front, rear, top, bottom, and side panels arranged to enclose an interior portion of the cable storage compartment whereby the front panel extends past the top, bottom, and side panels to form a front panel mounting flange;

a power strip receiving port fixedly attached to one of the side panels facing the interior portion of the cable storage compartment, the power strip receiving port is sized and configured to secure a power strip in a fixed location;

at least one access panel, sized and configured to be removably attached to the front panel; and a plurality of mounting clips composed of a metallic compound fixedly attached to the side panels of the cable storage compartment, having at least one edge sized and configured to engage a flat surface of a wall and sized and configured to engage the front panel mounting flange with a wall in a house to secure the apparatus in a fixed position.

10. A home theater connection cable and power cord organizing apparatus comprising:

a rectangular shaped cable storage compartment composed of a hard polymer or a plastic material, the cable storage compartment having;

a front panel, the front panel defines three openings, whereby each opening further comprises of a non-abrasive coating spanning the edge of each of said openings;

a rear panel that is smaller than the front panel;

a top panel;

a bottom panel; and oppositely arranged side panels;

the front, rear, top, bottom, and side panels arranged to enclose an interior portion of the cable storage compartment whereby the front panel extends past the top, bottom, and side panels to form a front panel mounting flange;

a power strip receiving port fixedly attached to one of the side panels facing the interior portion of the cable storage compartment, the power strip receiving port is sized and configured to secure a power strip in a fixed location;

at least one access panel, sized and configured to be removably attached to the front panel; and a plurality of mounting clips composed of a metallic compound fixedly attached to the side panels of the cable storage compartment, having at least one edge sized and configured to engage a flat surface of a wall and sized and configured to engage the front panel mounting flange with a wall in a house to secure the apparatus in a fixed position.

* * * * *